(12) United States Patent
Sekiguchi

(10) Patent No.: US 8,146,634 B2
(45) Date of Patent: Apr. 3, 2012

(54) PNEUMATIC TIRE

(75) Inventor: Takumi Sekiguchi, Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 361 days.

(21) Appl. No.: 12/419,808

(22) Filed: Apr. 7, 2009

(65) Prior Publication Data

US 2009/0283192 A1 Nov. 19, 2009

(30) Foreign Application Priority Data

May 13, 2008 (JP) .................... 2008-126406

(51) Int. Cl.
*B60C 19/12* (2006.01)
(52) U.S. Cl. ........ 152/504; 152/502; 152/503; 152/506; 152/507
(58) Field of Classification Search .......... 152/502–507, 152/510, DIG. 16; *B60C 19/12*
See application file for complete search history.

(56) References Cited

U.S. PATENT DOCUMENTS

| | | | | |
|---|---|---|---|---|
| 3,048,509 A | * | 8/1962 | Sweet et al. | 428/189 |
| 3,495,645 A | * | 2/1970 | Gough | 152/454 |
| 3,903,947 A | * | 9/1975 | Emerson | 152/504 |
| 5,824,170 A | * | 10/1998 | Weston et al. | 152/510 |
| 2004/0149366 A1 | * | 8/2004 | Makino et al. | 152/505 |
| 2004/0194862 A1 | * | 10/2004 | Fukutomi et al. | 152/204 |
| 2008/0142140 A1 | * | 6/2008 | Marks et al. | 152/505 |

FOREIGN PATENT DOCUMENTS

| | | | |
|---|---|---|---|
| JP | A 6-226870 | | 8/1994 |
| JP | 2003285376 A | * | 10/2003 |
| JP | A 2003-285376 | | 10/2003 |
| JP | A 2003-334868 | | 11/2003 |

* cited by examiner

*Primary Examiner* — Khanh P Nguyen
*Assistant Examiner* — Margaret Squalls
(74) *Attorney, Agent, or Firm* — Greer, Burns & Crain, Ltd.

(57) ABSTRACT

Provided is a pneumatic tire capable of suppressing a flow of a sealant in a sealant layer due to a centrifugal force generated during the running of the tire. A pneumatic tire of the present invention is a pneumatic tire provided with a sealant layer on an inner surface of the tire in a region corresponding to a tread portion of the tire. The pneumatic tire includes a cover sheet disposed on an inner side of the sealant layer in a radial direction of the tire so as to cover the sealant layer. In the pneumatic tire, a mass per unit area of a center portion of the cover sheet is made larger than a mass per unit area of outer portions of the cover sheet. A width of the cover sheet may be made smaller than a width of the sealant layer.

4 Claims, 2 Drawing Sheets

PNEUMATIC TIRE

BACKGROUND OF THE INVENTION

The present invention relates to a pneumatic tire provided with a sealant layer on an inner surface of the tire in a region corresponding to a tread portion of the tire, and more specifically relates to a pneumatic tire capable of suppressing a flow of a sealant in the sealant layer due to a centrifugal force generated during the running of the tire.

There are pneumatic tires each provided with a sealant layer on an inner surface of the tire in a region corresponding to a tread portion of the tire. A sealant contained in the sealant layer is generally composed of a compound which is not crosslinked. Thus, the sealant has appropriate viscosity and fluidity for the sealing of a hole, which would be formed by a foreign substance, such as a nail, getting stuck in the tread portion.

However, in the pneumatic tire including the sealant layer, the sealant sometimes flows toward the tread center due to a centrifugal force during the running of the tire, so that the amount of sealant is reduced near the shoulders of the tire. Such a formation of a portion where the amount of sealant is locally reduced in the sealant layer not only reduces the sealing performance, but also deteriorates the weight balance of the entire tire, possibly causing a problem in that vibrations are likely to occur.

In view of the above-described problems, an approach has been proposed in which a sealant layer is divided into a plurality of portions with partition walls in a width direction of the tire, so that a flow of the sealant in the sealant layer in the width direction of the tire is suppressed (see, for example, Japanese patent application Kokai publication Nos. 2003-285376, 2003-334868, and Hei. 6-226870).

However, dividing a sealant layer into a plurality of portions with partition walls in a width direction of the tire is significantly difficult to implement in actual manufacture of tires, and accordingly has not yet been put into practice in the current situation.

SUMMARY OF THE INVENTION

An object of the present invention is to provide a pneumatic tire capable of suppressing a flow of a sealant in the sealant layer due to a centrifugal force generated during the running of the tire.

A pneumatic tire of the present invention for achieving the above-described object is a pneumatic tire provided with a sealant layer on an inner surface of the tire in a region corresponding to a tread portion of the tire. The pneumatic tire is characterized by including a cover sheet disposed on an inner side of the sealant layer in a radial direction of the tire so as to cover the sealant layer, and is characterized in that a mass per unit area of a center portion of the cover sheet is made larger than a mass per unit area of outer portions of the cover sheet.

In addition, a pneumatic tire of the present invention for achieving the above-described object is a pneumatic tire provided with a sealant layer on an inner surface of the tire in a region corresponding to a tread portion of the tire. The pneumatic tire is characterized by including a cover sheet disposed on an inner side of the sealant layer in a radial direction of the tire so as to cover the sealant layer, and is characterized in that a thickness of a center portion of the cover sheet is made larger than a thickness of outer portions of the cover sheet.

Moreover, a pneumatic tire of the present invention for achieving the above-described object is a pneumatic tire provided with a sealant layer on an inner surface of the tire in a region corresponding to a tread portion of the tire. The pneumatic tire is characterized by including a cover sheet disposed on an inner side of the sealant layer in a radial direction of the tire, and characterized in that a width of the cover sheet is made smaller than a width of the sealant layer.

According to the present invention, in a pneumatic tire provided with a sealant layer on an inner surface of the tire in a region corresponding to a tread portion of the tire, a cover sheet is disposed on an inner side of the sealant layer in a radial direction of the tire, and the mass distribution of the cover sheet is relatively increased in a portion near the tread center, so that the flow of a sealant in the sealant layer toward the tread center can be suppressed by utilizing a centrifugal force acting on the cover sheet during the running of the tire. This makes it possible to secure an excellent sealing performance and to avoid an occurrence of vibration based on unbalanced weight. Moreover, since the above-described advantageous effects can be obtained by only adjusting the mass distribution of the cover sheet, the present invention has high feasibility as compared with such a case where a sealant layer is divided into a plurality of portions with partition walls as in the conventional approach.

In the case where the cover sheet is disposed on the inner side of the sealant layer in the radial direction of the tire so as to cover the sealant layer, and the mass per unit area of the center portion of the cover sheet is made larger than the mass per unit area of the outer portions of the cover sheet, it is preferable that a width of the center portion of the cover sheet be set in a range of 7% to 55% of a width of the sealant layer. This makes it possible to effectively suppress the flow of the sealant in the sealant layer.

In the case where the cover sheet is disposed on the inner side of the sealant layer in the radial direction of the tire so as to cover the sealant layer, and the thickness of the center portion of the cover sheet is made larger than the thickness of the outer portions of the cover sheet, it is preferable that a width of the center portion of the cover sheet be set in a range of 7% to 55% of a width of the sealant layer. Particularly, it is preferable that a thickness of the center portion of the cover sheet be set in a range of 130% to 250% of a thickness of the outer portions thereof. This makes it possible to effectively suppress the flow of the sealant in the sealant layer.

In the case where the cover sheet is disposed on the inner side of the sealant layer in the radial direction of the tire, and the width of the cover sheet is made smaller than the width of the sealant layer, it is preferable that the width of the cover sheet be set in a range of 7% to 55% of the width of the sealant layer. This makes it possible to effectively suppress the flow of the sealant in the sealant layer.

DETAILED DESCRIPTION OF THE PREFERRED EMBODIMENTS

Figure 1:
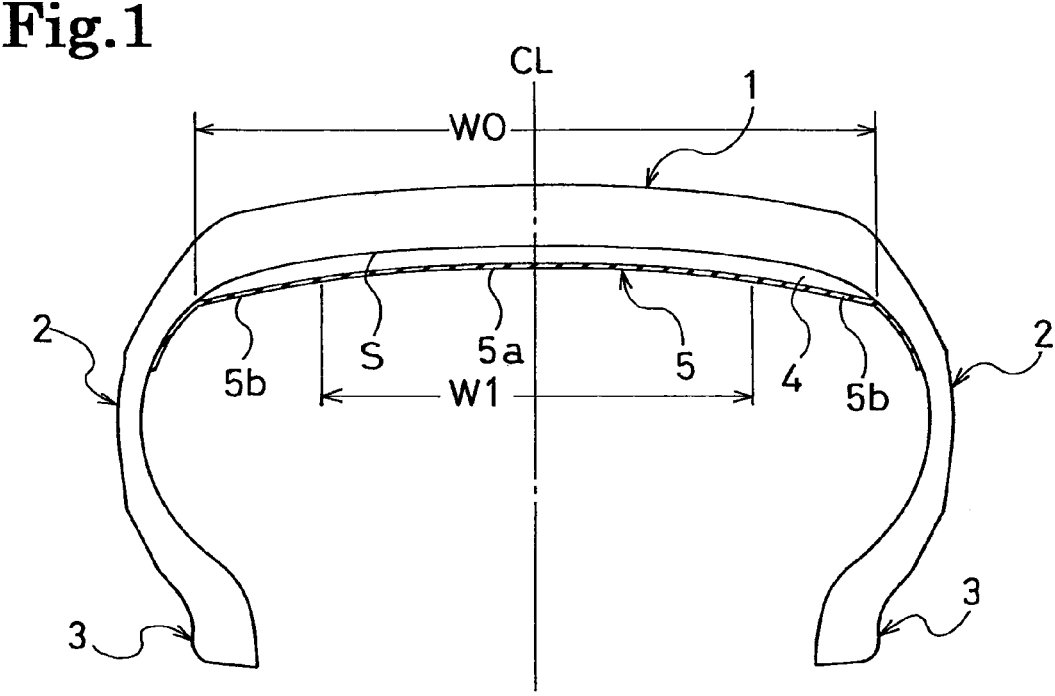
FIG. 1 is a meridian sectional view illustrating a pneumatic tire according to an embodiment of the present invention.

Hereinafter, a configuration of the present invention will be described in detail with reference to the accompanying drawings. FIG. 1 illustrates a pneumatic tire according to an embodiment of the present invention. In FIG. 1, reference numeral 1 denotes a tread portion, reference numeral 2 denotes sidewall portions, and reference numeral 3 denotes bead portions. As illustrated in FIG. 1, a sealant layer 4 is formed on an inner surface S of the tire in a region corresponding to the tread portion 1. The composition of the sealant layer 4 is not particularly limited, but the sealant layer 4 may be made of, for example, a rubber composition containing a rubber component such as polyisobutylene, polybutadiene, or isobutylene isoprene rubber. As the rubber composition for the sealant, it is favorable to use a rubber composition in which the crosslinkage of rubber component is suppressed or a rubber composition in which rubber components are decomposed by heat generated at a curing process. In addition, a tackifier, a softener, a filler, short fibers, and the like may be added to the rubber composition for the sealant as necessary.

In the pneumatic tire, a cover sheet 5 is formed on an inner side of the sealant layer 4 in a radial direction of the tire so as to cover the sealant layer 4. The width of the cover sheet 5 is made larger than the width of the sealant layer 4, and portions of the cover sheet 5, which are not overlapped with the sealant layer 4, are bonded to the inner surface S of the tire. Bonding both ends of the cover sheet 5 to the inner surface S of the tire is advantageous in suppressing the flow of the sealant in the sealant layer 4. The cover sheet 5 may be formed of a film made of a rubber or a resin, or alternatively may be formed of a nonwoven fabric or the like.

In the cover sheet 5, the mass per unit area ($g/cm^2$) of a center portion 5a is made larger than the mass per unit area ($g/cm^2$) of outer portions 5b. The following may be employed as means for relatively increasing the mass per unit area of the center portion 5a of the cover sheet 5. Specifically, the specific gravity or the density of the constituent materials of the cover sheet 5 is varied according to the position, or the thickness of the cover sheet 5 is varied according to the position. In this embodiment, while the thickness of the cover sheet 5 is made substantially uniform over the entire region, the density of the constituent materials in the center portion 5a is made larger than that in the outer portions 5b.

The mass distribution of the cover sheet 5 is relatively increased in a portion near the tread center on the basis of the mass per unit area of the cover sheet 5 as described above. This makes it possible to suppress the flow of the sealant in the sealant layer 4 toward the tread center by utilizing a centrifugal force acting on the cover sheet 5 during the running of the tire.

In the pneumatic tire, the width W1 of the center portion 5a of the cover sheet 5 is set in a range of 7% to 55%, or more preferably in a range of 25% to 55%, of the width W0 of the sealant layer 4. More specifically, the center portion 5a is arranged symmetrically on both sides of a center line CL of the tire. If the width W1 of the center portion 5a of the cover sheet 5 is out of the above-described range, an effect of selectively suppressing a portion, near the tread center, of the sealant layer 4 is reduced.

Figure 2:
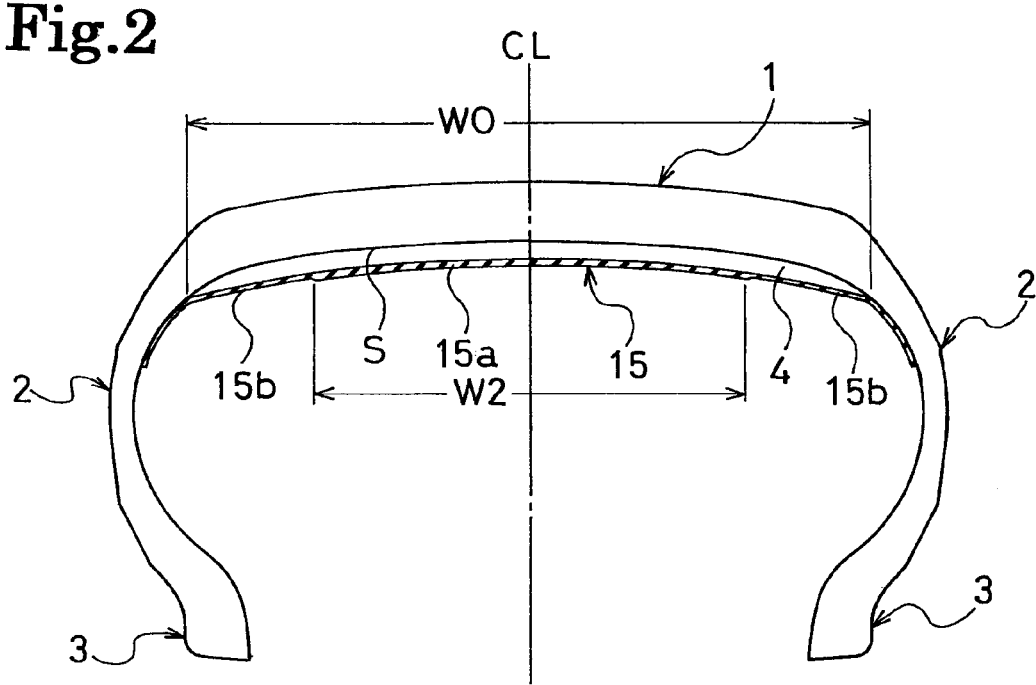
FIG. 2 is a meridian sectional view illustrating a pneumatic tire according to another embodiment of the present invention.

FIG. 2 illustrates a pneumatic tire according to another embodiment of the present invention. In FIG. 2, the same components as those illustrated in FIG. 1 are denoted by the same reference numerals, and detailed description of the components will be omitted.

As illustrated in FIG. 2, a cover sheet 15 is formed on an inner side of a sealant layer 4 in a radial direction of the tire so as to cover the sealant layer 4. The width of the cover sheet 15 is made larger than the width of the sealant layer 4, and portions of the cover sheet 15, which are not overlapped with the sealant layer 4, are bonded to the inner surface S of the tire. Bonding both ends of the cover sheet 15 to the inner surface S of the tire is advantageous in suppressing the flow of the sealant in the sealant layer 4. The cover sheet 15 may be formed of a film made of a rubber or a resin, or alternatively formed of a nonwoven fabric or the like.

In the cover sheet 15, the thickness of a center portion 15a is made larger than the thickness of outer portions 15b. As a result, in the cover sheet 15, the mass per unit area ($g/cm^2$) of the center portion 15a is larger than the mass per unit area ($g/cm^2$) of the outer portions 15b. The thickness of the center portion 15a of the cover sheet 15 may be uniform, or may be gradually increased toward the tread center. The cover sheet 15 in which the center portion 15a has a thickness different from the thickness of the outer portions 15b may be formed by being extruded to have a non-uniform thickness or by laminating a plurality of sheets.

The mass distribution of the cover sheet 15 is relatively increased in a portion near the tread center on the basis of the thickness of the cover sheet 15 as described above. This makes it possible to suppress the flow of the sealant in the sealant layer 4 toward the tread center by utilizing a centrifugal force acting on the cover sheet 15 during the running of the tire.

In the pneumatic tire, the width W2 of the center portion 15a of the cover sheet 15 is set in a range of 7% to 55%, or more preferably in a range of 25% to 55%, of the width W0 of the sealant layer 4. More specifically, the center portion 15a is arranged symmetrically on both sides of a center line CL of the tire. If the width W2 of the center portion 15a of the cover sheet 15 is out of the above-described range, an effect of selectively suppressing a portion, near the tread center, of the sealant layer 4 is reduced.

In addition, the thickness of the center portion 15a of the cover sheet 15 is set in a range of 130% to 250% of the thickness of the outer portions 15b. If the thickness of the center portion 15a of the cover sheet 15 is less than 130% of the thickness of the outer portions 15b, the effect of selectively suppressing a portion, near the tread center, of the sealant layer 4 is reduced. By contrast, if the thickness of the center portion 15a exceeds 250% of the thickness of the outer portions 15b, the portion, near the tread center, of the sealant layer 4 is reduced in thickness due to the centrifugal force generated during the running of the tire.

Figure 3:
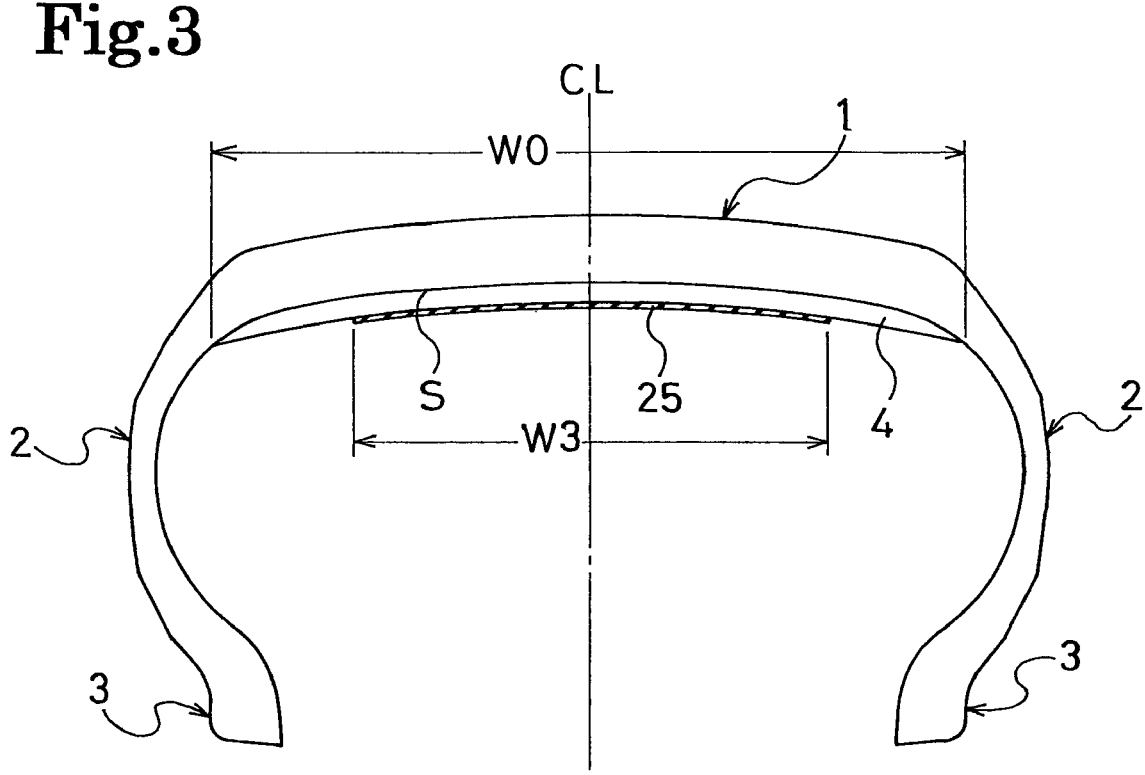
FIG. 3 is a meridian sectional view illustrating a pneumatic tire according to still another embodiment of the present invention.

FIG. 3 illustrates a pneumatic tire according to still another embodiment of the present invention. In FIG. 3, the same components as those illustrated in FIG. 1 are denoted by the same reference numerals, and detailed description of the components will be omitted.

As illustrated in FIG. 3, a cover sheet 25 is formed on an inner side of a sealant layer 4 in a radial direction of the tire. The width of the cover sheet 25 is made smaller than the width of the sealant layer 4. The cover sheet 25 may be formed of a film made of a rubber or a resin, or alternatively formed of a nonwoven fabric or the like.

The mass distribution of the cover sheet 25 is relatively increased in a portion near the tread center by causing the cover sheet 25 to have a smaller width than that of the sealant layer 4 as described above. This makes it possible to suppress the flow of the sealant in the sealant layer 4 toward the tread center by utilizing a centrifugal force acting on the cover sheet 25 during the running of the tire.

In the pneumatic tire, the width W3 of the cover sheet 25 is set in a range of 7% to 55%, or more preferably in a range of 25% to 55%, of the width W0 of the sealant layer 4. More specifically, the cover sheet 25 is arranged symmetrically on both sides of a center line CL of the tire. If the width W3 of the cover sheet 25 is out of the above-described range, an effect of selectively suppressing a portion, near the tread center, of the sealant layer 4 is reduced.

Although the preferred embodiments of the present invention have been described in detail so far, it should be understood that various modifications, substitutions, and replacements may be made on the embodiments without departing from the spirit and scope of the present invention defined in the scope of the attached claims.

Example

Pneumatic tires of Conventional Example and Examples 1 to 6 were prepared each having a tire size of 195/65R15 and including a sealant layer formed on an inner surface of the tire in a region corresponding to a tread portion of the tire. In these pneumatic tires of Comparative Example and Examples 1 to 6, the width W0 of the sealant layer was set at 160 mm, and a cover sheet was disposed on an inner side of the sealant layer in a radial direction of the tire while these pneumatic tires had structures of the cover sheets different from one another.

In the tire of Conventional Example, the cover sheet was disposed on the inner side of the sealant layer in the radial direction of the tire so as to cover the sealant layer. In addition, the thickness of the cover sheet was set uniform at 1 mm over the entire region thereof. In each of the tires of Examples 1 to 3, the cover sheet was disposed on the inner side of the sealant layer in the radial direction of the tire so as to cover the sealant layer. In addition, the thickness of a center portion of the cover sheet was set at 2 mm while the thickness of outer portions thereof was set at 1 mm. Moreover, the tires of Examples 1 to 3 were made different from one another in the ratio (W2/W0) of the width W2 of the center portion to the width W0 of the sealant layer. Furthermore, in each of the tires of Examples 1 to 3, the mass per unit area of the center portion of the cover sheet was made larger than the mass per unit area of the outer portions thereof. In each of the tires of Examples 4 to 6, the cover sheet having a thickness of 1 mm was disposed on the inner side of the sealant layer in the radial direction of the tire. In addition, the width of the cover sheet was made smaller than the width of the sealant layer. Moreover, the tires of Examples 4 to 6 were made different from one another in the ratio (W3/W0) of the width W3 of the cover sheet to the width W0 of the sealant layer.

Each of these tires was tested by running the tire for 80 hours with an air pressure of 220 kPa at a speed of 80 km/h. After the test, the width of the sealant layer was measured to obtain a changed amount (a decreased amount) from the original width thereof before the test. Moreover, the thickness of the sealant layer at the position of the tread center was measured. The results of the measurements are shown in Table 1.

TABLE 1

|  | Conventional Example | Example 1 | Example 2 | Example 3 | Example 4 | Example 5 | Example 6 |
| --- | --- | --- | --- | --- | --- | --- | --- |
| Structure of Cover Sheet | Uniform Thickness | FIG. 2 | FIG. 2 | FIG. 2 | FIG. 3 | FIG. 3 | FIG. 3 |
| W2/W0 | — | 0.1 | 0.5 | 0.8 | — | — | — |
| W3/W0 | — | — | — | — | 0.1 | 0.5 | 0.8 |
| Changed Amount of Width of Sealant Layer (mm) | 25 | 10 | 7 | 23 | 10 | 7 | 23 |
| Thickness of Sealant Layer at Center (mm) | 5.5 | 5.0 | 4.5 | 5.0 | 5.0 | 4.5 | 5.0 |

As shown in Table 1, each of the tires of Examples 1 to 6 had a smaller changed amount of the width of the sealant layer, and also had a smaller thickness of the sealant layer at the position of the tread center after the running, than those of the tire of Conventional Example. In other words, in each of the tires of Examples 1 to 6, the flow of the sealant in the sealant layer toward the tread center due to the centrifugal force generated during the running of the tire was suppressed.

What is claimed is:

1. A pneumatic tire provided with a sealant layer on an inner surface of the tire in a region corresponding to a tread portion of the tire, the pneumatic tire comprising:
    a cover sheet disposed on an inner side of the sealant layer in a radial direction of the tire so as to cover the sealant layer, the cover sheet having a center portion formed axially between two outer portions, the center portion being centered on the sealant layer, wherein a mass per unit area of the center portion of the cover sheet is made larger than a mass per unit area of the outer portions of the cover sheet;
    wherein the width of the center portion of the cover sheet is set in a range of 7% to 55% of the width of the sealant layer.

2. A pneumatic tire provided with a sealant layer on an inner surface of the tire in a region corresponding to a tread portion of the tire,
    the pneumatic tire comprising a cover sheet disposed on an inner side of the sealant layer in a radial direction of the tire so as to cover the sealant layer, the cover sheet having a center portion formed axially between two outer portions, the center portion being centered on the sealant layer, wherein the thickness of the center portion of the cover sheet is made larger than the thickness of the outer portions of the cover sheet;
    wherein the width of the center portion of the cover sheet is set in a range of 7% to 55% of the width of the sealant layer.

3. The pneumatic tire according to claim 2, wherein the thickness of the center portion of the cover sheet is set in a range of 130% to 250% of the thickness of the outer portions thereof.

4. A pneumatic tire provided with a sealant layer on an inner surface of the tire in a region corresponding to a tread portion of the tire, the pneumatic tire comprising a cover sheet disposed on an inner side of the sealant layer in a radial direction of the tire, the cover sheet having a center portion formed axially between two outer portions, the center portion being centered on the sealant layer;

the cover sheet covering the tread center portion of the sealant layer;

wherein the width of the cover sheet is made smaller than the width of the sealant layer;

wherein the width of the cover sheet is set in a range of 7% to 55% of the width of the sealant layer.

* * * * *